United States Patent [19]

Fujii

[11] 4,418,128

[45] Nov. 29, 1983

[54] METAL-BROMINE SECONDARY BATTERY

[75] Inventor: Toshinobu Fujii, Hino, Japan

[73] Assignee: Meidensha Electric Mfg. Co., Ltd., Tokyo, Japan

[21] Appl. No.: 361,817

[22] Filed: Mar. 25, 1982

[51] Int. Cl.³ .............................................. H01M 2/40
[52] U.S. Cl. ..................................... 429/70; 429/105; 429/198; 429/199
[58] Field of Search .................. 429/101, 105, 80, 81, 429/70, 198, 199

[56] References Cited

U.S. PATENT DOCUMENTS

| | | | |
|---|---|---|---|
| 3,811,945 | 5/1974 | De Rossi | 429/105 |
| 3,813,301 | 5/1974 | Carr | 429/105 X |
| 4,038,460 | 7/1977 | Walsh et al. | 429/101 X |
| 4,064,324 | 12/1977 | Eustace . | |
| 4,146,680 | 3/1979 | Carr et al. | 429/70 X |

*Primary Examiner*—Charles F. LeFevour
*Attorney, Agent, or Firm*—Fleit, Jacobson, Cohn & Price

[57] ABSTRACT

In an electrolyte circulation type metal-bromine secondary battery of the kind in which the negatively active material is a metal selected from the group consisting of cadmium, zinc and lead, the anode electrolyte storage tank comprises an anode electrolyte zone and a complexing agent zone having a cross-sectional area smaller than that of the anode electrolyte zone.

3 Claims, 4 Drawing Figures

METAL-BROMINE SECONDARY BATTERY

BACKGROUND OF THE INVENTION

The present invention relates to electrolytes circulation type metal-halogen batteries and in particular to improvements in metal-bromine secondary batteries of the type employing bromine as a positively active material.

More particularly, the invention relates to a secondary battery in which a complexing agent is added to the anode electrolyte storage tank such that particularly the bromine molecules in the electrolyte form a bromic complex compound to separate in a diphasic manner in the lower part of the electrolyte or even if the complexing agent does not unite with the bromine, the complexing agent does not dissolve into the electrolyte or does not easily dissolve into the electrolyte to separate from the electrolyte in a diphasic manner, thus effectively maintaining the electrolyte in the desired condition and preventing the self-discharge and/or increase in the battery internal resistance and thereby making the electrolyte storage tank compact and high in safety.

DESCRIPTION OF THE PRIOR ART

The electrolyte circulation type metal-halogen secondary batteries heretofore known in the art have the principle or the construction such as shown in FIG. 1. In this battery, an anode electrolyte ($ZnBr_2 + Br_2$) is contained in one reaction chamber 2 of a cell 1 and a cathode electrolyte ($ZnBr_2$) is contained in the other reaction chamber 3. The chambers 2 and 3 are divided from one another by an ion-exchange membrane 4. An anode 5 is positioned in the anode electrolyte and a cathode 6 is positioned in the cathode electrolyte. The anode electrolyte is supplied by a pump 11 from anode electrolyte storage tank 9 via a valve 13 and the cathode electrolyte is supplied by a pump 12 from a cathode electrolyte storage tank 10 via 14.

When the metal-bromine secondary battery of the above construction is charged, the bromine is deposited at the anode and the metal is deposited at the cathode. While the metal deposited at the cathode is electrodeposited on the cathode plate surface, the bromine deposited at the anode is dissolved into the electrolyte and is circulated along with the electrolytes.

As a result, the bromine deposited during the operation of the battery is introduced into the zinc side of the opposite electrode via the separator, which is to be a major cause for the occurrence of self-discharge. Also, since the bromine molecules belong to the halogens, the bromine molecules are highly corrosive and thus give limitations to the materials for constructing batteries.

To overcome these deficiencies, methods have heretofore been proposed in which quarternary ammonium salt is used to form a bromine-complex compound and thereby to liberate the bromine from the electrolyte. The complex compounds of quarternary ammonium salt which have heretofore been proposed are all completely soluble in aqueous solutions which are the electrolytes.

As a result, while the addition of a complexing agent inevitably deteriorates the electric conductivity of the electrolyte, the complexing agent and the electrolyte form a single phase so that the rate of reaction between the deposited bromine and the complexing agent is high and thus there is no need to incorporate any special means in the construction of the electrolyte tank with respect to the reaction.

However, where the electrolyte and the complexing agent are separated into two phases, it is necessary to incorporate special means in the anode electrolyte storage tank so as to ensure a rapid reaction between the bromine molecules and the complexing agent. Even in such cases, the use of any external energy, e.g., agitation or heating for improving the reaction efficiency is not desirable since this results in a loss of the station power.

SUMMARY OF THE INVENTION

The inventors have made research works incessantly with a view to overcoming the foregoing deficiencies and have made some success by selecting as the complexing agent such substances which are capable of separating the bromine from the electrolyte and insoluble in the electrolyte.

It is therefore the object of this invention to provide an electrolyte circulation type secondary battery employing an improved electrolyte storage tank construction which satisfies the following two requirements for improving the efficiency of reaction between an electrolyte and a complexing agent in cases where the two form two separate phases.

(1) The reaction surface area for the bromine molecules and the complexing agent are increased.

(2) The contacting period for the bromine molecules and the complexing agent is increased.

Note that the term complexing agent refers for example to any of tertiary amines represented by the general formula R R'R"N where R, R' and R" are alkyl radicals. In this case, while the alkyl radicals may be the same, at least one of them is selected to be higher than the propyl radical ($C_3H_7$—).

DESCRIPTION OF THE PREFERRED EMBODIMENTS

The invention will now be described in detail with reference to the illustrated embodiments.

Figure 2:
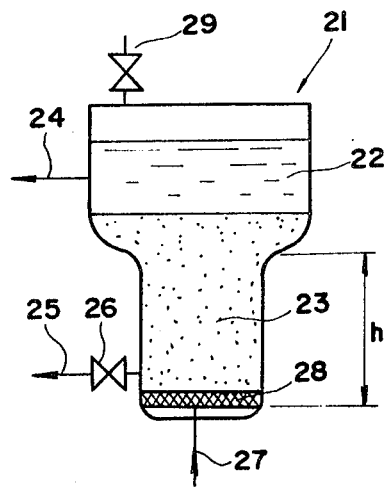
FIG. 2 is a schematic diagram showing the construction of an embodiment of this invention.

Referring to FIG. 2, numeral 21 designates an anode electrolyte storage tank comprising an upper electrolyte zone 22 and a complexing agent zone 23 (or a zone of complexing agent and bromic complex compound). Numeral 24 designates an upper electrolyte connecting pipe, 25 a bromic complex compound connecting pipe, 26 a valve, and 27 an electrolyte inlet connecting pipe. Numeral 28 designates a fine perforated filter positioned in the lower part of the electrolyte storage tank 21, and 29 an exhaust pipe.

Figure 1:
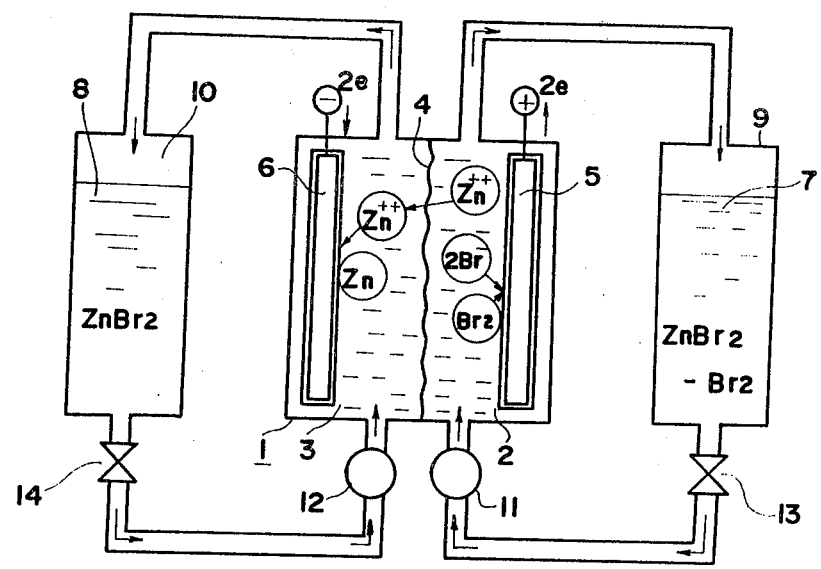
FIG. 1 is a diagram showing the principle of a prior art electrolyte circulation type metal-bromine secondary battery.

With the battery of this invention constructed as described above, the electrolyte returned from the cell 1 (FIG. 1) is introduced into the tank upper part from the electrolyte inlet connecting pipe 27 via the fine perforated filter 28. In this case, the electrolyte is finely divided so that by virtue of this and the buoyance due to the specific gravity difference the electrolyte floats into the upper part so as to satisfy the above-mentioned requirement (1). In the course of this flotage the electrolyte passes through the complexing agent zone 23 so that the bromine reacts with the complexing agent and a bromic complex compound is formed. As shown in the FIG. 2, the lower part (the complexing agent zone 23) of the electrolyte storage tank 21 is smaller in cross-sectional area than the tank upper part (the upper electrolyte zone 22) and this is for the purpose of increasing the period of reaction (contact) between the introduced electrolyte and the complexing agent and satisfying the above-mentioned requirement (2). The invention is not intended to be limited to this specific shape and the lower part may be shaped into an inverted frust-conical form. On the other hand, while the relation between the bottom surface of the electrolyte storage tank 21 and the part of the complexing agent zone 23 only needs to be determined by the amounts of the electrolyte and complexing agent which are contained in desired amounts, it is desirable that the height "h" of the complexing agent zone 23 be as large as possible so as to increase the reaction period.

After the bromine molecules have been removed, during the charge the electrolyte is supplied to the cell via the electrolyte connecting pipe 24, and during the discharge the valve 26 is opened so that a mixture of the electrolyte and the complexing agent is supplied to the cell.

Figure 3:
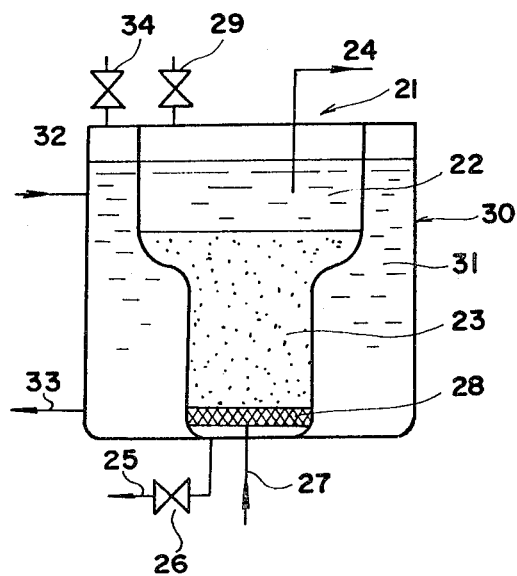
FIG. 3 is a schematic diagram showing the construction of another embodiment of this invention.

FIG. 3 shows another embodiment of the invention which differs from the first embodiment described in connection with FIG. 2 in that a cathode electrolyte storage tank 30 is arranged around the anode electrolyte storage tank 21. Numeral 31 designates a cathode electrolyte, 32 a cathode electrolyte inlet connecting pipe, 33 a cathode electrolyte outlet connecting pipe, and 34 an exhaust pipe. In this embodiment, the anode electrolyte is circulated in the same manner as in the case of FIG. 2 and the cathode electrolyte is supplied via the cathode electrolyte outlet connecting pipe 33 into the cell chamber from which the electrolyte is returned to the cathode electrolyte storage tank 30 via the cathode electrolyte inlet connecting pipe 32.

To show the effect of this invention, the following examples show the electrolyte conductivities obtained by using as the complexing agent three different tertiary amines and the conventional quarternary ammonium salt, respectively.

| complexing agent | Electrolyte composition | $K(mho \cdot cm^{-1})$ |
|---|---|---|
| $(C_2H_5)_4N.Br$ | $ZnBr_2(3M) + (C_2H_5)_4N.Br\ (0.2M)$ | 0.106 |
| $(CH_3)_3N$ | $ZnBr_2(3M) + (CH_3)_3N\ (0.9M)$ | 0.081 |
| $(C_2H_5)_3N$ | $ZnBr_2(3M) + (C_2H_5)_3N\ (0.9M)$ | 0.075 |
| $(C_3H_7)_3N$ | $ZnBr_2(3M) + (C_3H_7)_3N\ (0.9M)$ | 0.110 |

Since the conductivity of the used aqueous solution of zinc bromide is $0.124\ mho.cm^{-1}$ at the room temperature, the conductivity of the supernatant electrolyte obtained by using the tripropylamine is low and advantageous from the standpoint of the battery internal resistance, too.

Figure 4:
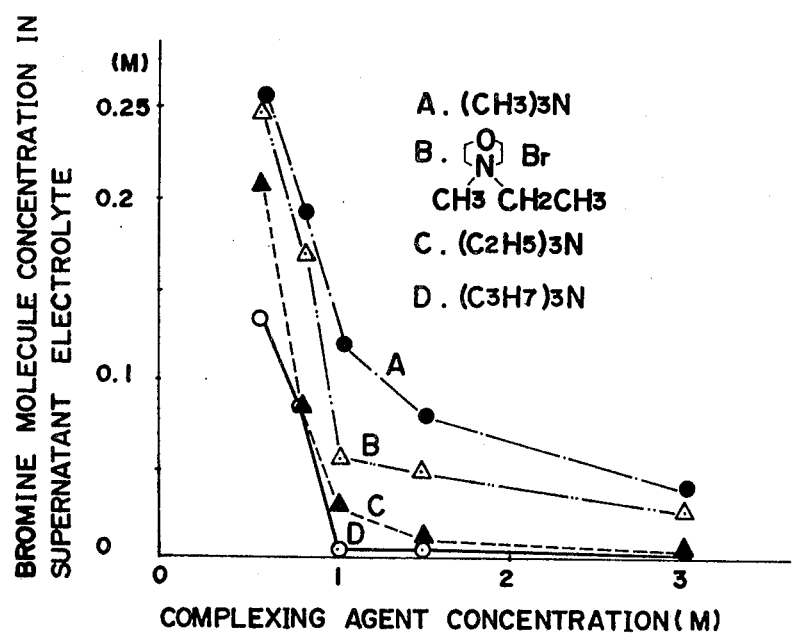
FIG. 4 is a graph showing the relation between the complexing agent concentration and the bromine molecule concentration in the supernatant electrolyte.

FIG. 4 shows the concentrations of the unabsorbed bromine molecules remaining in the upper electrolytes after a given amount of bromine had been dropped in the electrolytes containing complexing agents of different concentrations. As will be seen from the Figure, among the examples of this invention the addition of the tripropylamine, though small in amount, had the effect of absorbing the bromine satisfactorily and there was no trace of the bromine molecules in the supernatant electrolyte when 2.5 mols of it was added.

From the foregoing description it will be seen that the present invention has the following advantages.

(1) Due to the increased reaction surface area for the bromine molecules and the complexing agent and the increased reaction (contact) period between the two, the reaction efficiency of bromic complex compound is high and thus the efficiency of the battery is also high.

(2) Since no external energy is used so as to increase the reaction efficiency, there is no danger of causing any station power loss.

(3) Where the anode electrolyte storage tank is arranged within the cathode electrolyte storage tank, externally the tanks appear as a single tank and they can be formed into a cylindrical or cubic shape which is compact and greatly advantageous from the standpoint of utilization of the space.

(4) Also the zone of the bromic complex compound formed in the anode electrolyte storage tank is protected by the cathode electrolyte storage tank and thus external shocks are lessened, thereby eliminating the danger of leakage of the bromic complex compound and ensuring safety.

(5) The anode electrolyte storage tank is subjected to a hydrostatic pressure due to the cathode electrolyte storage tank and practically there is no difference between the inner and outer pessures. Thus, the tanks can easily be made from any synthetic resin material which is thin and having excellent corrosion resisting properties.

What is claimed is:

1. In an electrolyte circulation type secondary battery in which the positively active material is bromine and the negatively active material is a metal selected from the group consisting of cadmium, zinc and lead, wherein the improvement in the metal-bromine secondary battery comprises an anode electrolyte storage tank having a complexing agent storage tank having a smaller cross-sectional area contained in the lower portion therein, wherein recycled electrolyte is introduced in the anode electrolyte storage tank by first passing the electrolyte through a complexing agent stored in the lower portion therein.

2. A secondary battery according to claim 1, wherein said anode electrolyte storage tank is disposed within a cathode electrolyte storage tank.

3. A secondary battery according to claim 1, wherein a filter is arranged in the lower part of said anode electrolyte storage tank.

* * * * *